(12) United States Patent
Griffioen

(10) Patent No.: US 8,385,694 B2
(45) Date of Patent: Feb. 26, 2013

(54) AUTOMATED OPTICAL SWITCH AND METHOD

(75) Inventor: Willem Griffioen, Ter Aar (NL)

(73) Assignee: Draka Comteq B.V. (NL)

( * ) Notice: Subject to any disclaimer, the term of this patent is extended or adjusted under 35 U.S.C. 154(b) by 287 days.

(21) Appl. No.: 12/556,156

(22) Filed: Sep. 9, 2009

(65) Prior Publication Data

US 2010/0067850 A1   Mar. 18, 2010

Related U.S. Application Data

(60) Provisional application No. 61/097,614, filed on Sep. 17, 2008.

(51) Int. Cl.
*G02B 6/26* (2006.01)
*G02B 6/42* (2006.01)

(52) U.S. Cl. .................................. 385/16; 385/25
(58) Field of Classification Search ............ 385/16, 385/25

See application file for complete search history.

(56) References Cited

U.S. PATENT DOCUMENTS

| | | | |
|---|---|---|---|
| 4,653,849 A | | 3/1987 | Boirat et al. |
| 4,818,059 A | * | 4/1989 | Kakii et al. .......... 385/65 |
| 4,834,488 A | * | 5/1989 | Lee .................. 385/57 |
| 4,950,048 A | * | 8/1990 | Kakii et al. .......... 385/83 |
| 4,952,263 A | * | 8/1990 | Kakii et al. .......... 156/153 |
| 5,035,482 A | * | 7/1991 | ten Berge et al. ....... 385/16 |
| 5,185,824 A | * | 2/1993 | Grimes et al. .......... 385/19 |
| 5,337,384 A | | 8/1994 | Basavanhally et al. |
| 5,446,810 A | * | 8/1995 | Watanabe et al. ........ 385/22 |
| 5,796,896 A | * | 8/1998 | Lee .................. 385/59 |
| 6,190,054 B1 | * | 2/2001 | Tamaki et al. ........... 385/53 |
| 6,419,405 B1 | * | 7/2002 | Boscha ............... 385/93 |
| 6,771,426 B2 | * | 8/2004 | Yamamoto et al. ...... 359/641 |
| 6,859,575 B1 | | 2/2005 | Arol et al. |
| 6,951,425 B2 | * | 10/2005 | Vergeest .............. 385/59 |
| 7,702,193 B2 | * | 4/2010 | Arol et al. ............ 385/17 |
| 2002/0181841 A1 | | 12/2002 | Lemoff et al. |
| 2003/0002803 A1 | * | 1/2003 | Trezza et al. .......... 385/53 |
| 2003/0165299 A1 | | 9/2003 | Kao |
| 2003/0231831 A1 | * | 12/2003 | Yamamoto et al. ...... 385/39 |
| 2004/0071407 A1 | * | 4/2004 | Vergeest .............. 385/58 |
| 2008/0019642 A1 | * | 1/2008 | Kewitsch ............. 385/72 |

FOREIGN PATENT DOCUMENTS

| | | |
|---|---|---|
| EP | 1 321 786 A1 | 6/2003 |
| JP | 6-109945 A | 4/1994 |
| JP | 6 258584 A | 9/1994 |
| JP | 8 54570 A | 2/1996 |
| WO | 2006054300 A2 | 5/2006 |
| WO | WO2006/054300  * | 5/2006 |

OTHER PUBLICATIONS

European Search Report dated Jul. 7, 2010 for Application No. EP 09 01 1803.5.
European Patent Office Search Report dated Mar. 28, 2012 for European Patent Application No. 09 011 803.5.

* cited by examiner

*Primary Examiner* — K. Cyrus Kianni
(74) *Attorney, Agent, or Firm* — Shumaker, Loop & Kendrick, LLP

(57) ABSTRACT

An automated optical switch for use in a central office to increase coupling density including a frame having a mating plate defining a plurality of precision alignment holes formed therethrough. In one embodiment, the precision alignment holes are sized and configured to receive corresponding pairs of optical fibers with polished end faces disposed within ferrules free of connector housings. In another embodiment, the precision alignment holes are sized and configured to receive optical fibers with polished end faces free of ferrules and connector housings.

9 Claims, 5 Drawing Sheets

AUTOMATED OPTICAL SWITCH AND METHOD

BACKGROUND OF THE INVENTION

The invention relates generally to automated switches, and more particularly, to an automated optical switch suitable for use in a communications network. In one embodiment, ferrules having optical fibers disposed therein are optically connected directly through a mating plate having a plurality of precision alignment holes. In another embodiment, optical fibers are optically connected directly through a mating plate having high precision alignment holes. In yet another embodiment, a method of increasing the coupling density of an automated optical switch is provided wherein ferrules having optical fibers disposed therein are optically connected directly through a mating plate having a plurality of precision alignment holes. In still another embodiment, a method of increasing the coupling density of an automated optical switch is provided wherein optical fibers are optically connected directly through a mating plate having a plurality of precision alignment holes.

It is common practice to use automated optical switches in a communications data center. Automated optical switches can also be used in the central office of a telecommunications network to replace the conventional "cross-connect" or "patch" panel of an optical distribution frame, and thereby reduce operating expenses. The most efficient robotic automated optical switch currently available for use in a telecommunications central office can accommodate only 180×180 non-blocking connections on a 19 inch (48.3 cm) wide rack having 20 cm high bays, which can practically be cascaded to a maximum of around 1000×1000 non-blocking connections. In a "non-blocking" optical switch any of the input optical fibers can be optically connected to any of the output optical fibers, provided that each input optical fiber is connected to only one output optical fiber. The typical central office, however, currently requires on the order of 10000×10000 connections. Furthermore, the cost-per-connection of an existing robotic automated optical switch is exceedingly high for fiber-to-the-home (FttH) networks.

Examples of known robotic automated optical switches are shown and described in U.S. Pat. No. 6,859,575 B1 and International Publication No. WO 2006/054300 A2 of International Application No. PCT/IL2005/001220, the disclosures of which are incorporated herein by reference. These known optical switches (referred to as optical crossbar switches) optically couple the end of one of a plurality of first (i.e. input) optical fibers each mounted to a different carriage moveable along a predetermined trajectory with the end of one of a plurality of second (i.e. output) optical fibers. A motor is configured to translate the moveable carriage of the first optical fiber in the predetermined trajectory to align the first optical fiber with one of the plurality of second optical fibers. The motor also moves a slack-control carriage to take up slack in the first optical fiber generated by movement of its carriage in the predetermined trajectory.

Automated optical switches based on micro-electro-mechanical systems (MEMS) also are not suitable to replace the optical coupling equipment on an optical distribution frame in a central office of a telecommunications network since such switches fail during a power interruption. In short, the currently available automated optical switches for use in a central office of a telecommunications network do not provide a sufficient number of non-blocking optical connections, are not cost-efficient to operate, or fail when there is an interruption of electrical power to the switch.

Accordingly, there exists an unresolved need for an improved automated switch. There exists a more specific need for an improved automated optical switch suitable for use in a communications network. There exists a still more specific need for an automated switch that provides a sufficient number of non-blocking connections, is cost-efficient to operate, and does not fail when there is an interruption of electrical power to the switch.

BRIEF SUMMARY OF THE INVENTION

The aforementioned needs, as well as others that will be readily apparent to those of ordinary skill in the art, are provided by an automated switch according to the invention. An exemplary embodiment of an automated optical switch according to the invention includes a frame defining a mating plate having a plurality of precision alignment holes formed therethrough.

In one embodiment, an automated optical switch according to the invention includes a mating plate having a plurality of precision alignment holes for receiving ferrules having optical fibers with polished end faces disposed therein. Pairs of the ferrules are positioned, aligned and optically connected directly through the alignment holes so as to increase the coupling density of the automated optical switch by at least about two times (2×) compared to an existing robotic automated optical switch including a metal frame having square openings for receiving the connector housings.

In another embodiment, an automated optical switch according to the invention includes a mating plate having a plurality of precision alignment holes for receiving optical fibers having polished end faces. Pairs of the optical fibers are positioned, aligned and optically connected directly through the alignment holes so as to increase the coupling density of the automated optical switch by at least about six times (6×) compared to an existing robotic automated optical switch including a metal frame having square openings for receiving the connector housings.

In yet another embodiment, a method according to the invention includes providing a mating plate having a plurality of precision alignment holes for receiving ferrules having optical fibers with polished end faces disposed therein. The method further includes positioning, aligning and optically connecting corresponding pairs of the ferrules directly through the alignment holes so as to increase the coupling density of the automated optical switch by at least about two times (2×) compared to an existing robotic automated optical switch including a metal frame having square openings for receiving the connector housings.

In still another embodiment, a method according to the invention includes providing a mating plate having a plurality of precision alignment holes for receiving optical fibers having polished end faces. The method further includes positioning, aligning and optically connecting corresponding pairs of the optical fibers directly through the alignment holes so as to increase the coupling density of the automated optical switch by at least about six times (6×) compared to an existing robotic automated optical switch including a metal frame having square openings for receiving the connector housings.

BRIEF DESCRIPTION OF THE DRAWINGS

The present invention is best understood by reference to the following detailed description taken in conjunction with the accompanying drawing figures in which.

DETAILED DESCRIPTION OF THE INVENTION

Figure 1B:
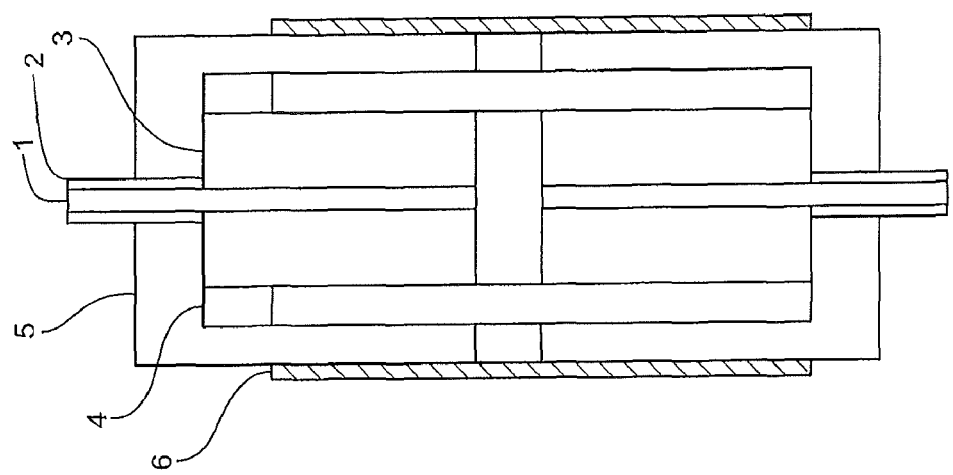
FIGS. 1A and 1B are corresponding end and top plan views, respectively, of an existing robotic automated optical switch and method for optically coupling optical fiber connectors through a metal cross-connect or patch panel in a central office of a telecommunications network.

The invention will be described hereinafter with reference to the accompanying drawing figures, wherein identical reference numerals denote the same elements throughout the various views, so as to enable one of ordinary skill in the art to make, use and practice the invention without undue experimentation.

Figure 1A:
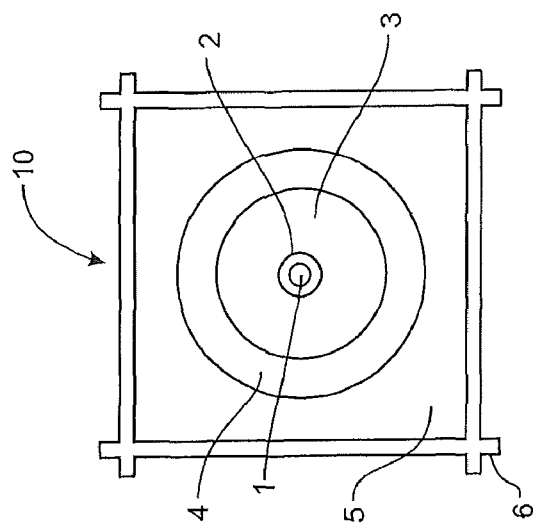

FIGS. 1A and 1B illustrate an existing (i.e. prior art) robotic automated optical switch 10 for optically coupling optical fiber connectors through a metal cross-connect or patch panel in a central office of a telecommunications network. Generally speaking, an optical fiber comprises a cylindrical body 1 (usually quartz) having a nominal diameter of about 125 microns ($\mu m$) surrounded by a coating 2 (usually plastic) having an outer diameter of about 250 microns ($\mu m$). For purposes of this disclosure, the term "optical fiber" typically refers to the cylindrical body 1 (including a core and any cladding) with the coating 2 stripped away. As shown in FIGS. 1A and 1B, the end of the optical fiber 1 stripped from the coating 2 is affixed, for example glued, within a central bore formed in a ferrule 3, such as made of a ceramic material. Before gluing, the optical fiber 1 is preferably aligned in the central bore of the ferrule 3 such that the core is exactly in the center of the ferrule 3. The ferrule 3 typically has a nominal outer diameter of about 1.25 mm. A male ferrule 3 disposed within a connector housing 5 is aligned opposite a female ferrule 3 disposed within a like connector housing 5 using an annular cylinder or sleeve 4 that is integrally formed with the female ferrule. The connector housings 5 are then positioned opposite one another and latched together into a metal optical frame 6 having square openings for receiving the connector housings.

In ferrules in which the core of the optical fiber is not perfectly centered, alignment of the optical fibers may be accomplished optically by determining the direction (i.e. rotation angle) of the misalignment. This method includes polishing the ferrules in advance, generally after curing of the glue, and preparing the connectors in such a manner that the alignment error of both ferrules in the connector are present in the same direction. This method of minimizing alignment error may also be applied to the embodiments described below that lack connector housings.

Figure 2B:
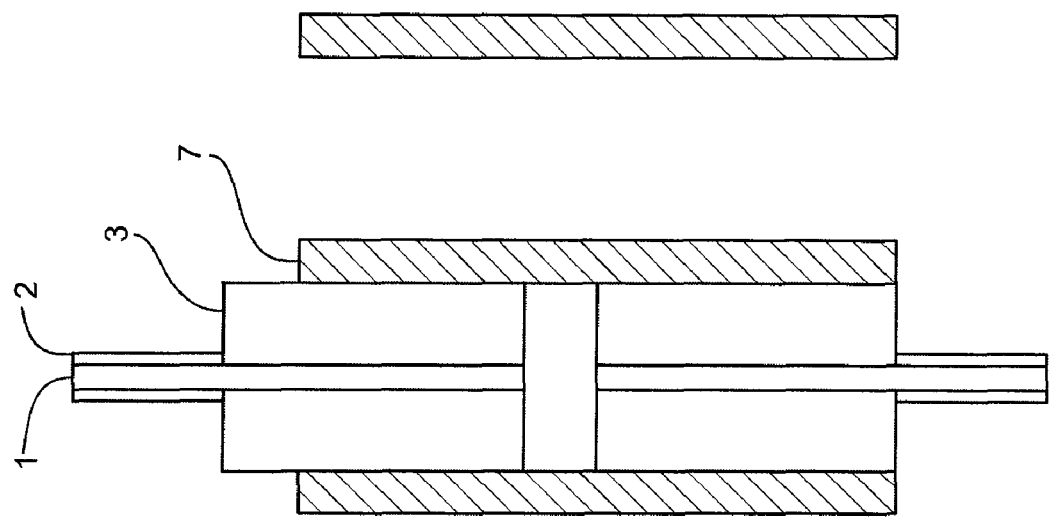
FIGS. 2A and 2B are corresponding end and top plan views, respectively, of one embodiment according to the invention of an automated optical switch and a method for optically coupling ferrules through a mating plate having a plurality of precision alignment holes in a central office of a telecommunications network.
Figure 2A:
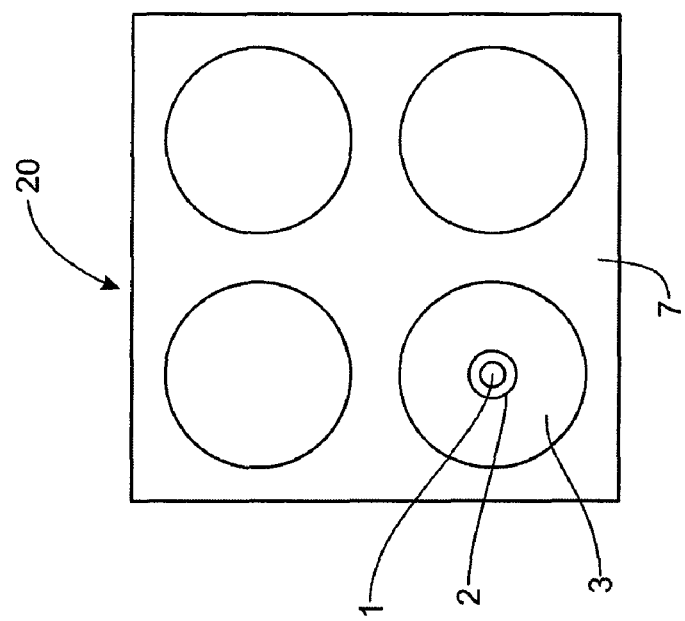

FIGS. 2A and 2B illustrate one embodiment of an automated optical switch 20 according to the invention for optically coupling ferrules having optical fibers disposed therein. In contrast to the robotic automated optical switch 10 shown in FIGS. 1A and 1B, the optical switch 20 does not require the annular sleeve 4 integrally formed with one of the ferrules 3 or the connector housings 5 disposed about the ferrules. Instead, pairs of the ferrules 3 containing optical fibers 1 (i.e. the ends of the optical fibers stripped from their coatings 2) having polished end faces are positioned opposite one another and optically connected directly through a "frame." As shown herein, the frame is in the form of a mating plate 7 having a plurality of circular, precision alignment holes formed through the plate. Accordingly, the function of positioning and aligning the ferrules 3 is accomplished by the mating plate 7 alone. As a result, the mating plate 7 increases the number of optical connections available in the same amount of space, referred to herein as the "coupling density," by a factor of at least about two times (2×) compared to the metal optical frame 6 shown in FIGS. 1A and 1B having square openings for receiving the connector housings 5.

The ferrules 3 may be secured to the mating plate 7 through suitable connecting elements and guiding elements using search pins and latching elements (e.g. latching springs) positioned in neighboring ones of the precision alignment holes in the line of movement of the optically coupled ferrules, as will be described further below. It is possible to locate search pins and latching springs in this manner since only one of the alignment holes in the line of movement of the optically coupled ferrules is used at a time to optically connect the ferrules 3 through the mating plate 7. This same concept may likewise be utilized when optical fibers are optically connected through a mating plate, as will be described further below.

The mating plate 7 is preferably made of a thermally-stable material in order to minimize thermal expansion and contraction. Machine steel, for example, is undesirable in most instances since the coefficient of thermal expansion of a mating plate 7 made of steel could result in shrinkage of the hole by as much as about 1.5 $\mu m$ in an environment that experiences a 100° C. change in temperature. Furthermore, the machining tolerance required for forming the precision holes should be less than about 1 $\mu m$. Accordingly, the mating plate 7 is preferably made of a ceramic material having a coefficient of thermal expansion about thirty times (30×) less than the thermal expansion coefficient of machine steel. The use of a mating plate 7 made of a suitable ceramic material having precision alignment holes machined with a tolerance of less than about 1 $\mu m$ can easily double the number of optical connections (i.e. the coupling density) that can be made relative to a conventional optical frame 6 made of machine steel. An even greater increase in coupling density can be obtained by using smaller, non-standard ferrules, smaller than the small form factor (SFF) ferrules for LC type optical connectors used today. Alternatively, the mating plate 7 may be made of metal if the precision holes and the ferrules 3 themselves are small enough and the absolute thermal expansion or contraction of the diameter of the precision holes remains well below 1 $\mu m$. The mating plate 7 may also be made of a magnetic material, or may be coated with a magnetic material, in order to offer the possibility of "magnetic latching" the ferrules 3 to the mating plate. Still further, the mating plate 7 may have a sandwich construction comprising an inner layer made of a ceramic material and a pair of outer layers made of a metallic material. In this construction, the precision holes in the magnetic sandwich material are preferably slightly larger in diameter than the precision holes in the ceramic sandwich material.

Figure 3B:
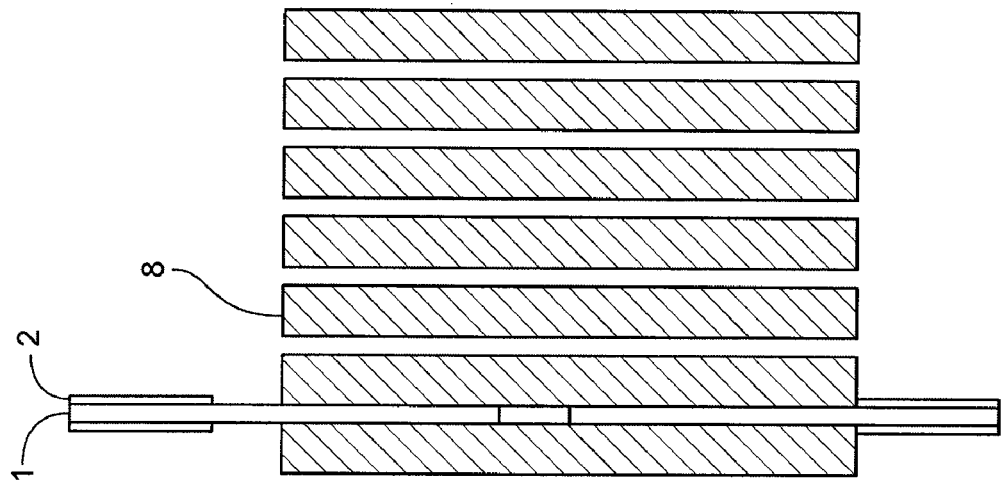
FIGS. 3A and 3B are corresponding end and top plan views, respectively, of another embodiment according to the invention of an automated optical switch and a method for optically coupling optical fibers through a mating plate having a plurality of precision alignment holes in a central office of a telecommunications network.
Figure 3A:
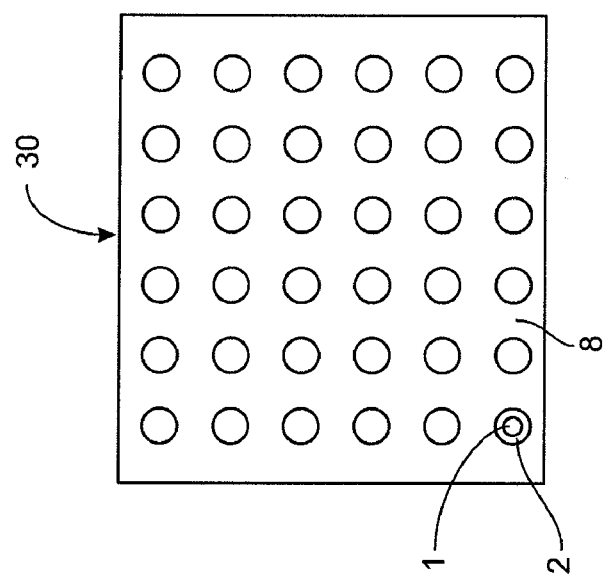

FIGS. 3A and 3B illustrate another embodiment of an automated optical switch 30 according to the invention for optically coupling optical fibers. Similar to the automated optical switch 20 shown in FIGS. 2A and 2B, the optical switch 30 does not require the annular sleeve 4 integrally formed with one of the ferrules 3 or the connector housings 5 disposed about the ferrules utilized with the robotic automated optical switch 10 shown in FIGS. 1A and 1B. In contrast to the automated optical switch 20, however, pairs of the optical fibers 1 (i.e. the ends of the optical fibers stripped from their coatings 2) having polished end faces are positioned opposite one another and optically connected directly through smaller precision alignment holes formed through a mating plate 8 having a similar construction as the mating plate 7 previously described. Thus, the ferrules 3 of the automated optical switch 20 are not utilized and the optical fibers 1 are positioned and aligned using only the precision holes formed through the mating plate 8. The end faces of the optical fibers 1 may be polished using temporary ferrule "sleeves" or may be polished in any other suitable manner. Optimally, optical fibers 1 with closely matching or identical diameters, having low ellipticities and exceptionally low core eccentricities are desired. Accordingly, the optical fibers having the lowest core eccentricities are selected for use with the automated optical switch 30 to provide optical connections of the highest quality (e.g. lowest loss factor). This is very important because, unlike with ferrules 3, no further tuning to position the core exactly in the center of the optical fiber 1 can be done.

Since the diameter of the precision holes formed through the mating plate 8 is about ten times (10×) smaller than the diameter of the precision alignment holes formed through the mating plate 7 of the automated optical switch 20, the mating plate 8 of the automated optical switch 30 may be made of a metallic material. As previously mentioned, the metallic material may be a magnetic material in order to provide for the possibility of "magnetic latching" in addition to latching using neighboring precision holes. The latter may be more difficult given the smaller diameter of the precision alignment holes and the reduced dimensions between optical fibers 1. Furthermore, "search pins" slightly smaller in diameter than the optical fibers 1 may be utilized in the neighboring precision holes since direct positioning of the optical fibers 1, for example by a robot, will be somewhat more difficult than direct positioning of the connector housings 5 and the ferrules 3 for the robotic automated optical switches 10 and 20 shown in FIGS. 1A and 1B, and FIGS. 2A and 2B, respectively.

Regardless, the coupling density of the mating plate 8 of the automated optical switch 30 is increased by a factor of at least about three (3) compared to the mating plate 7 of the automated optical switch 20, and by a factor of at least about six (6) compared to the metal optical frame 6 of the robotic automated optical switch 10.

Figure 4:
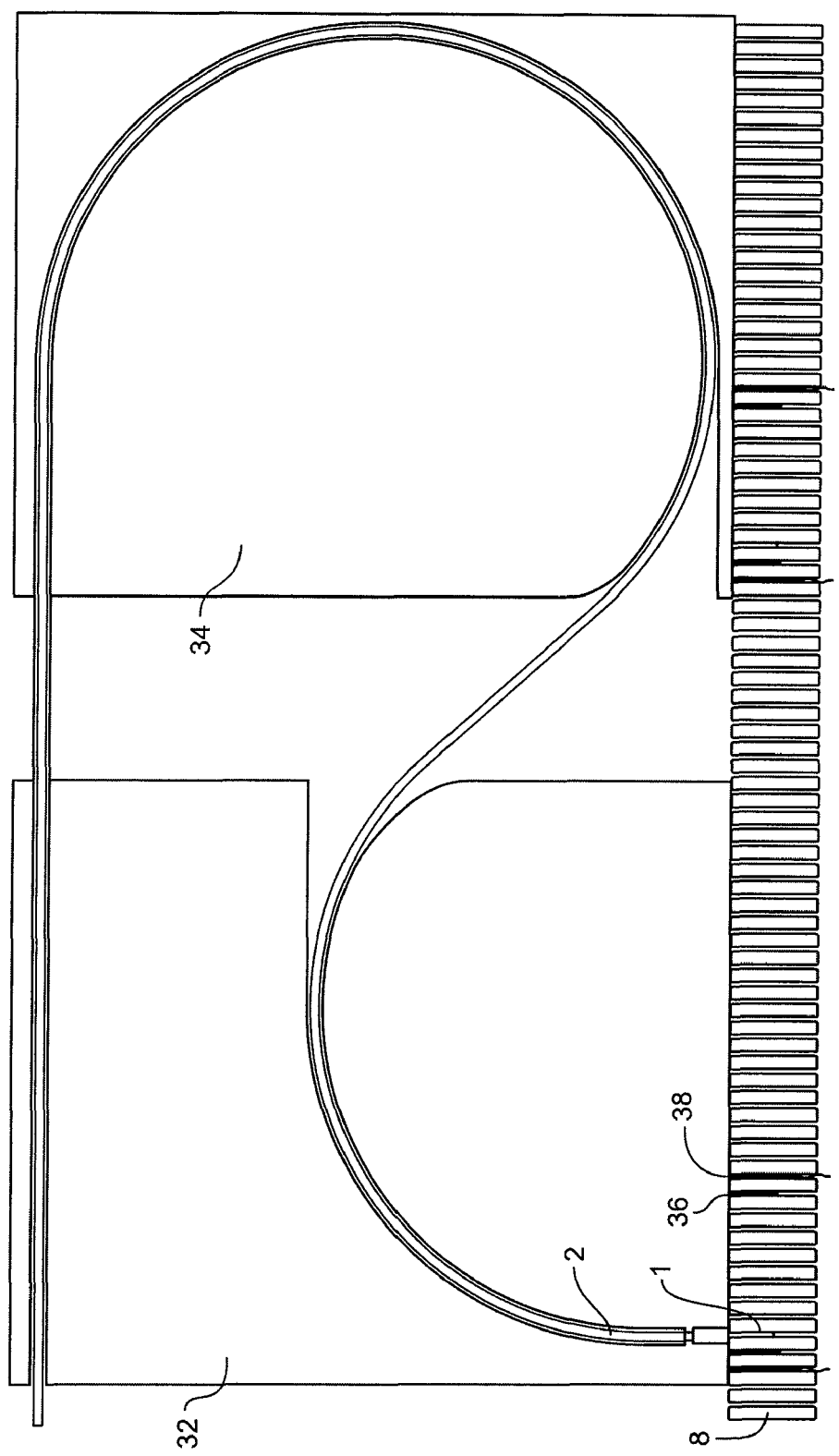
FIG. 4 shows an example of an automated optical switch according to the embodiment of FIG. 3.

FIG. 4 illustrates an example of an automated optical switch 30 according to the embodiment of FIG. 3 (i.e. with the ends of the optical fibers 1 stripped from their coatings 2 and connected directly through the alignment holes of mating plate 8). Shown is a side view of two moveable elements 32, 34 using the same principle as the crossbar switch disclosed in International Publication No. WO 2006/054300 A2 of International Application No. PCT/IL2005/001220. The connecting element 32 coupling the optical fibers is shown on the left of FIG. 4 along with the search pins 36 and optional latching springs 38. The connecting element 32 is made thin enough that it falls within the width between adjacent alignment holes in the line of movement of the counter-connecting element (not shown). This is required because the movement of connecting elements above the mating plate 8 is at a right angle (i.e. 90 degrees rotated) to the movement of counter-connecting elements below the mating plate. As a result, the connecting elements must be thinner than the distance between alignment holes of the mating plate 8 in order to permit the passage of adjacent connecting elements.

Shown on the right of FIG. 4 is the guiding element 34 that moves with the connecting element 32. As explained in International Publication No. WO 2006/054300 A2 of International Application No. PCT/IL2005/001220 and incorporated herein, the guiding element 34 need move only half the distance that the connecting element 32 moves since the fiber is fixed to an edge of the non-moving mating plate 8 adjacent the opening of the connecting element 32 and is fixed again within the connecting element adjacent an alignment hole. Otherwise, the fiber moves freely throughout the connecting element 32 and the guiding element 34. The fiber is looped as follows: it enters from the left through the upper slit formed in the connecting element 32 and makes a clockwise loop through the semi-circular pathway formed in the guiding element 34. The fiber then comes back into the connecting element 32 through the lower curved slit and terminates in the end of the optical fiber 1 that is optically connected through the mating plate 8. In this way, the total length of the fiber remains constant while moving from left to right and vice versa. In order to move the connecting and guiding elements 32, 34, the robot first lifts the elements upward, so that the optical fiber 1, search pins 36 and latching springs 38 disengage from their respective alignment holes and move freely. When in position, the connecting and guiding elements 32, 34 are pushed downward again until they latch. In the front view (not shown), the connecting element 32 with slits for the fiber is sandwiched between two other very thin elements, thereby keeping the fiber within the slits.

Figure 5:
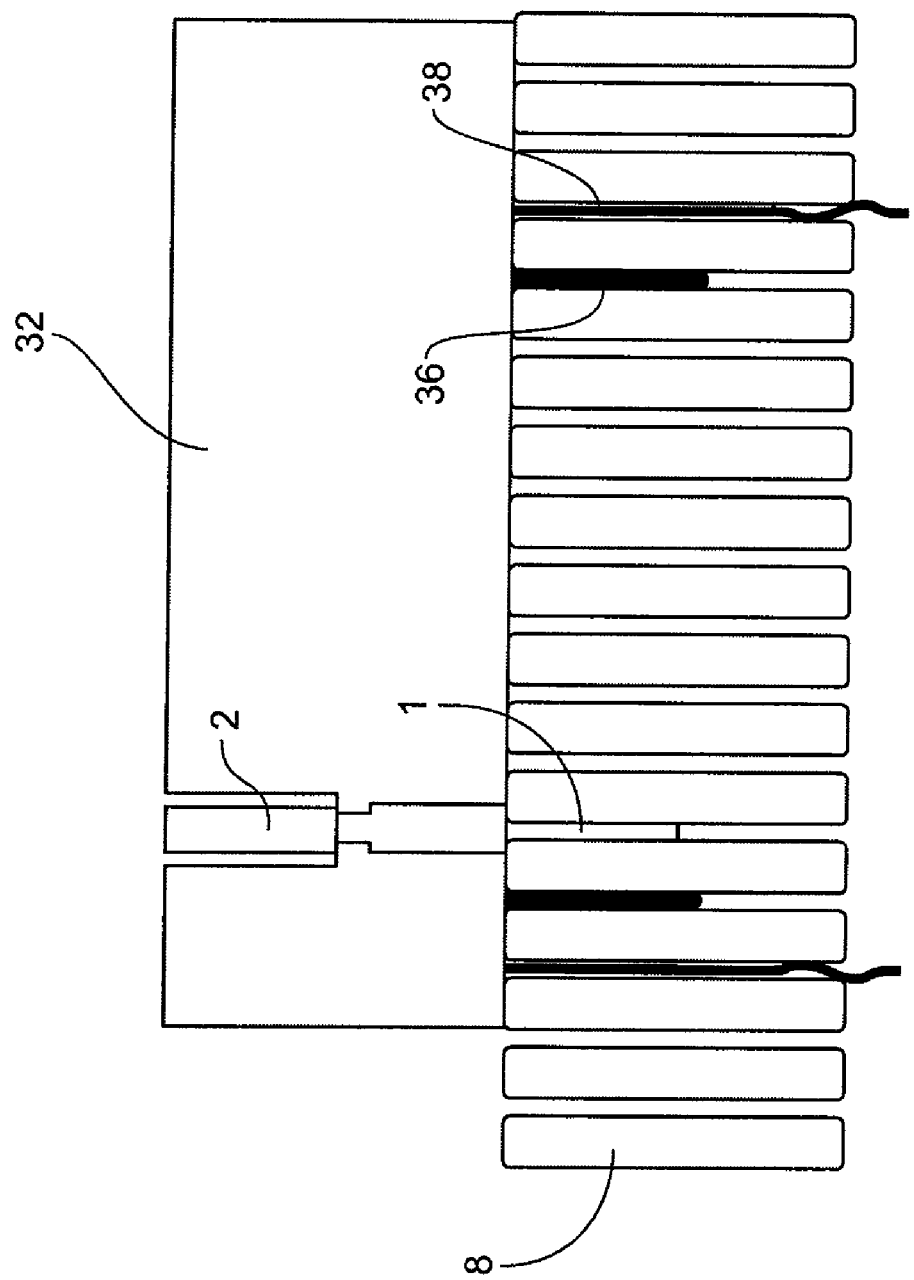
FIG. 5 is an enlarged view showing a portion of the automated optical switch of FIG. 4.

FIG. 5 is an enlarged view showing a portion (i.e. the lower left) of the connecting element 32 and mating plate 8. FIG. 5 further illustrates that search pins 36 may be located in neighboring alignment holes of the mating plate 8 and latching springs 38 may be optionally located in yet other neighboring alignment holes of the mating plate 8.

The increase in the optical coupling density provided by the automated optical switch 30 in relation to the robotic automated optical switch 10 is notably significant The increase in coupling density of either two times (2×) (2×2=4 times as many connection positions in the plate), which is possible to achieve with the automated optical switch 20, or six times (6×) (6×6=36 times as many connection positions in the plate), which is possible to achieve with the automated optical switch 30, is accompanied by a corresponding decrease in the price per optical connection mainly determined by the dominating cost of the robot. In certain embodiments, an automated optical switch constructed in accordance with the invention can provide more than about 1000× 1000 non-blocking optical connections, and when cascaded, as many as about 10000×10000 optical connections. Such configurations are particularly well suited for handling FttH optical connections in a central office of an optical telecommunications network.

The foregoing has described one or more exemplary embodiments of an automated optical switch including a frame defining a mating plate having a plurality of precision alignment holes formed through the plate and a method for increasing the coupling density of an automated optical switch. While particular embodiments of the present invention have been described, it will be apparent to those skilled in the art that various modifications thereto can be made without departing from the spirit and scope of the invention. Accordingly, the foregoing description of the preferred embodiments of the invention and the best mode for practicing the invention are provided for the purpose of illustration only, and not for the purpose of limitation.

That which is claimed is:

1. An automated optical switch comprising:
    a mating plate made of thermally stable material having a plurality of circular precision alignment holes formed therethrough sized and configured for receiving and aligning mating optical fibers free of connector housings;
    a connecting element moveable relative to the mating plate for switching an optical fiber between the plurality of precision alignment holes in the line of movement of the connecting element;
    a guiding element moveable with the connecting element for guiding the optical fiber secured within the connecting element; and
    search pins of the connecting and guiding elements configured to locate in neighboring ones of the precision alignment holes in use for connecting optical fibers;
    wherein the optical fiber of the connecting element passes through the connecting element, makes a clockwise loop through a pathway in the guiding element, reenters the connecting element through a curved slit, and terminates for being received within only one of the plurality of precision alignment holes at a time.

2. The automated optical switch according to claim 1, wherein the mating optical fibers are positioned within a ferrule, ferrules being positioned opposite one another and optically connected directly through the precision alignment holes of the mating plate.

3. The automated optical switch according to claim 2, wherein the coupling density of the optical switch is increased by a factor of at least two compared to the coupling density of an optical switch having a metal optical frame with square openings for receiving connector housings to optically connect optical fibers disposed within connector housings.

4. The automated optical switch according to claim 2, wherein the optically connecting optical fibers disposed within the ferrules have matching alignment error directions.

5. The automated optical switch according to claim 1, wherein the coupling density of the optical switch is increased by a factor of at least six compared to the coupling density of an optical switch having a metal optical frame with square openings for receiving connector housings to optically connect ferrules disposed within connector housings.

6. The automated optical switch according to claim 1, wherein the optical fibers are selected from optical fibers having low core eccentricities.

7. The automated optical switch according to claim 1, wherein the mating plate includes at least one of metallic and ceramic material.

8. The automated optical switch according to claim 1, wherein the mating plate includes magnetic material to provide for magnetic latching.

9. The automated optical switch according to claim 1, further comprising latching springs configured to locate in neighboring ones of the precision alignment holes.

* * * * *